(12) United States Patent
Buarque et al.

(10) Patent No.: US 11,906,070 B2
(45) Date of Patent: Feb. 20, 2024

(54) VALVE ACTUATION SYSTEM THROUGH PERMANENT MAGNET USE

(71) Applicant: Nextern Innovation, LLC, White Bear Lake, MN (US)

(72) Inventors: Fernando Buarque, White Bear Lake, MN (US); Christopher Narveson, Minneapolis, MN (US); Ryan J. Douglas, Victoria (CA); John Swoyer, Blaine, MN (US)

(73) Assignee: Nextern Innovation, LLC, White Bear Lake, MN (US)

( * ) Notice: Subject to any disclaimer, the term of this patent is extended or adjusted under 35 U.S.C. 154(b) by 357 days.

(21) Appl. No.: 17/303,216

(22) Filed: May 24, 2021

(65) Prior Publication Data

US 2021/0388918 A1   Dec. 16, 2021

Related U.S. Application Data

(60) Provisional application No. 63/030,101, filed on May 26, 2020.

(51) Int. Cl.
    *F16K 31/08*    (2006.01)
(52) U.S. Cl.
    CPC .................................. *F16K 31/084* (2013.01)
(58) Field of Classification Search
    CPC .... F16K 31/084; F16K 11/044; F16K 11/161; F16K 11/165; F16K 31/086; F16K 31/088; A61H 9/0092; A61H 2201/5056
    See application file for complete search history.

(56) References Cited

U.S. PATENT DOCUMENTS

| | | | |
|---|---|---|---|
| 4,349,042 A * | 9/1982 | Shimizu | F16K 17/36 137/460 |
| 5,169,117 A | 12/1992 | Huang | |

(Continued)

FOREIGN PATENT DOCUMENTS

| | | | | |
|---|---|---|---|---|
| EP | 1406035 A1 * | 4/2004 | ............ | F16K 11/044 |
| NL | 8600525 A * | 10/1986 | ........... | F16K 31/003 |
| WO | WO-2016162516 A1 * | 10/2016 | ............. | B67C 11/04 |

OTHER PUBLICATIONS

Chen, C.-Y.; Chen, C.-H.; Tu, T.-Y.; Lin, C.-M.; Wo, A. M. Electrical Isolation and Characteristics of Permanent Magnet-Actuated Valves for PDMS Microfluidics. Lab Chip 2011, 11 (4), 733-737, retrieved from the internet Mar. 1, 2021, https://doi.org/10.1039/C0LC00415D.https://pubs.rsc.org/en/content/articlelanding/2011/lc/c0lc00415d.

(Continued)

*Primary Examiner* — Mohamad A Musleh
(74) *Attorney, Agent, or Firm* — Craige Thompson; Thompson Patent Law; Timothy D. Snowden

(57) ABSTRACT

Apparatus and associated methods relate to a valve having an actuator configured to translate a mass in a plane and a valve element located out of the first plane and configured to translate along a first linear axis. In an illustrative example, at least one of the mass and the valve element may include a magnetic source providing a persistent magnetic field and the other may include a non-magnetized, magnetically permeable mass. Reluctance-induced forces may, for example, translate the valve element towards the mass along the first linear axis when the mass is brought into register with a second linear axis. The first linear axis and the second linear axis may, for example, be colinear. Various embodiments may advantageously provide a valve requiring low energy input for operation.

20 Claims, 17 Drawing Sheets

(56) References Cited

U.S. PATENT DOCUMENTS

| | | | |
|---|---|---|---|
| 5,388,614 | A | 2/1995 | Hakamada et al. |
| 7,284,571 | B2 | 10/2007 | Ozawa et al. |
| 10,738,908 | B1 | 8/2020 | Brookins |
| 10,851,908 | B2 | 12/2020 | Wheeler |
| 10,914,394 | B2 | 2/2021 | Ziegler et al. |
| 2010/0006788 | A1 | 1/2010 | Tanner et al. |
| 2019/0170268 | A1 | 6/2019 | Beyer |

OTHER PUBLICATIONS

DKM Pumps. Magnetic Check Valves. Clextral | DKM Pumps, 2011, retrieved from the internet Mar. 9, 2021, http://www.dkmpumps.com/accessoire/clapets-magnetiques/.

Yamahata, C.; Chastellain, M.; Hofmann, H.; Gijs, M. A. M. A Ferrofluid Micropump for Lab-on-a-Chip Applications. 2003, retrieved from the internet Mar. 1, 2021, https://www.researchgate.net/publication/37423698_A_ferrofluid_micropump_for_lab-on-achip_applications.

Yamahata, C.; Chastellain, M.; Parashar, V. K.; Petri, A.; Hofmann, H.; Gijs, M. A. M. Plastic Micropump with Ferrofluidic Actuation. J. Microelectromech. Syst. 2005, 14 (1), 96-102, retrieved from the internet Mar. 1, 2021, https://doi.org/10.1109/JMEMS.2004.839007. http://ieeexplore.ieee.org/document/1390940/.

\* cited by examiner

VALVE ACTUATION SYSTEM THROUGH PERMANENT MAGNET USE

CROSS-REFERENCE TO RELATED APPLICATIONS

This application claims the benefit of U.S. Application Ser. No. 63/030,101, titled "Valve Actuation System Through Permanent Magnet Use," filed by Buarque, et al., on May 26, 2020.

This application contains related subject matter by a common inventor with:

- U.S. application Ser. No. 15/873,760, titled "Solenoid Operated Valve with Flux Density Concentration Ring and Molded-In Valve Seat," filed by Casey Carlson, et al., on Jan. 17, 2018, and issued as U.S. Pat. No. 10,619,755 on Apr. 14, 2020;
- CN Application Serial No. 2019100447535, titled "Solenoid Operated Valve with Flux Density Concentration Ring and Molded-In Valve Seat," filed by Casey Carlson, et al., on Jan. 17, 2019, and issued as CN Patent No. ZL 2019 1 00447535 on Feb. 2, 2021;
- U.S. application Ser. No. 15/824,874, titled "Barrel Valve for Generation of Customizable Pressure Waveforms," filed by Paul Hattan on Nov. 28, 2017;
- U.S. application Ser. No. 16/806,866, titled "Solenoid Operated Valve with Flux Density Concentration Ring and Molded-In Valve Seat," filed by Casey Carlson, et al., on Mar. 2, 2020; and,
- U.S. Application Ser. No. 62/963,857, titled "Electronically Slowed Solenoid Valve to Reduce Closing Sound Via Minimization of Valve Gap and Controlled Release of Magnetic Force," filed by Fernando Buarque, et al., on Jan. 21, 2020.

This application incorporates the entire contents of the foregoing application(s) herein by reference.

TECHNICAL FIELD

Various embodiments relate generally to reluctance-coupled magnetic valves.

BACKGROUND

Various devices and/or systems may employ fluid communication. For example, residential, commercial, industrial, medical, and other environments may communicate fluid between components and/or devices. By way of example and not limitation, therapeutic massage equipment may cyclically provide fluid from at least one fluid (e.g., pressurized) source to multiple outlets.

Fluid communication may be selectively controlled. For example, valves may provide selective fluid communication between an inlet and an outlet. Valves may, for example, provide on/off control, flow rate control, or some combination thereof. Valves may, by way of example and not limitation, include ball valves, gate valves, pinch valves, saddle valves, globe valves, check valves, butterfly valves, or some combination thereof. Valves may be provided with, by way of example and not limitation, manual actuation mechanisms, solenoid actuators, hydraulic actuators, pneumatic actuators, electromechanical actuators, or some combination thereof.

SUMMARY

Apparatus and associated methods relate to a valve having an actuator configured to translate a mass in a plane and a valve element located out of the first plane and configured to translate along a first linear axis. In an illustrative example, at least one of the mass and the valve element may include a magnetic source providing a persistent magnetic field and the other may include a non-magnetized, magnetically permeable mass. Reluctance-induced forces may, for example, translate the valve element towards the mass along the first linear axis when the mass is brought into register with a second linear axis. The first linear axis and the second linear axis may, for example, be colinear. Various embodiments may advantageously provide a valve requiring low energy input for operation.

Various embodiments may achieve one or more advantages. For example, some embodiments may be substantially passive (e.g., requiring little or no energy input) in multiple modes. For example, various embodiment may be substantially passive in both an 'open' and a 'closed' position. Accordingly, various embodiments may advantageously reduce energy requirements for operation. Various embodiments may, for example, advantageously increase reliability.

Various embodiments may, for example, reduce duration and/or quantity of power input (e.g., electrical energy) during operation. Various embodiments may, for example, advantageously employ low-energy actuators. Accordingly, various embodiments may, for example, advantageously reduce thermal dissipation, radiation, conduction, convection, or some combination thereof from one or more valves.

Various embodiments may, for example, advantageously achieve thinner profiles using non-magnetized materials with elevated magnetic permeability. Some embodiments may, for example, advantageously allow a non-magnetized magnetically permeable mass to be in proximity to magnetically sensitive components (e.g., circuits, pacemakers, electromagnetic signal paths). Embodiments may, for example, advantageously reduce cost by use of non-magnetized magnetically permeable materials. Various embodiments may, for example, advantageously reduce fluctuation in magnetic field(s).

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a reluctance-coupled valve system is introduced with reference to FIGS. 1-2. Second, that introduction leads into a description with reference to FIGS. 3-7 of some exemplary embodiments of translating mass and valve element configurations. Third, with reference to FIGS. 8-16B, and exemplary reluctance-coupled valve is disclosed. Finally, the document discusses further embodiments, exemplary applications and aspects relating to reluctance-coupled magnetic valves.

Figure 1:
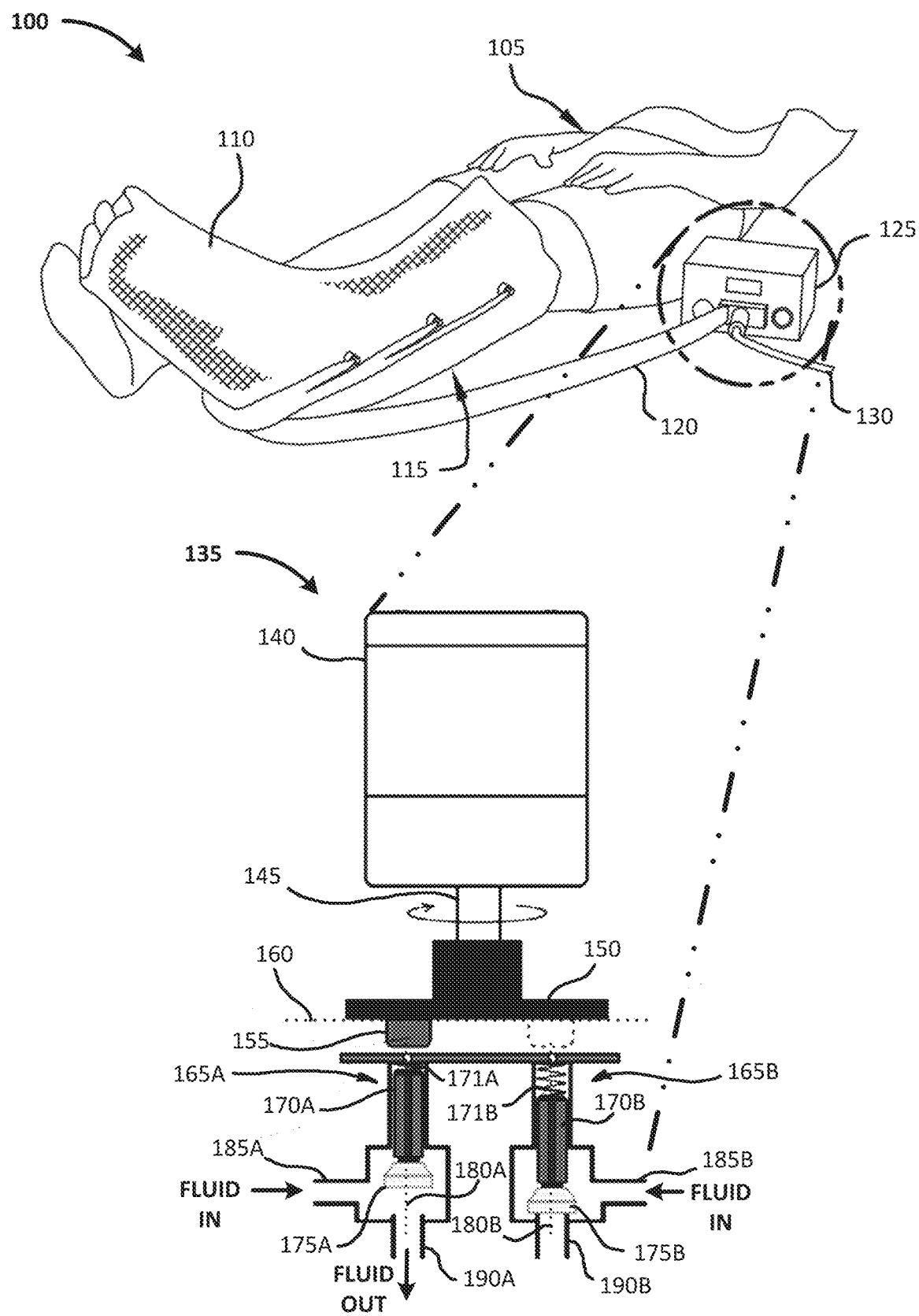
FIG. 1 depicts an exemplary reluctance-coupled magnetic valve employed in an illustrative use case scenario.

FIG. 1 depicts an exemplary reluctance-coupled magnetic valve employed in an illustrative use case scenario. In the depicted scenario 100, a patient 105 is fitted with a compression boot 110. The compression boot and is provided with multiple fluid (e.g., air) conduits 115. The fluid conduits 115 may, for example, be subsequently activated in a repeating pattern to rhythmically inflate and/or deflate portions of the compression boot 110. Accordingly, the foot and/or leg of the user 105 may, by way of example and not limitation, be rhythmically massaged.

In the depicted example, the conduits 115 travel together within a conduit 120 (e.g., for convenience of conduit management, safety to prevent tangling, durability to prevent damage to individual conduits) to a control unit 125. The control unit 125 selectively fluidly connects at least one of the conduits 115 at a time to a fluid source 130. In the depicted example, the control unit 125 selectively fluidly connects the conduits 115 to the fluid source 130 via a control valve 135. As depicted, the control valve 135 is a reluctance-coupled magnetic valve.

The valve 135 is provided with a rotary actuator 140. The actuator 140 rotates a shaft 145. The shaft 145 is coupled to a carriage 150. The carriage 150 is coupled to a mass 155. Rotation of the carriage 150 causes the mass 155 to be translated along a curvilinear path in a first plane 160. As depicted, the curvilinear path is a circle defined by a radius extending from the axis of rotation of the shaft 145 to the mass 155. Accordingly, the mass 155 is brought registration with a first valve unit 165A and a second valve unit 165B.

Each valve unit 165 is provided with a valve element 170. The valve element 170 is coupled to a sealing element 175. The valve element 170 and sealing element 175 are constrained to travel along a linear axis 180. A biasing element 171 urges the valve element 170 downward along the linear axis 180. At least one of the mass 155 and the valve element 170 may be a magnetic source. The other of the mass 155 and the valve element 170 may be a non-magnetized, magnetically permeable mass. For example, the mass 155 may be a permanent magnet. The valve may be a non-magnetized, magnetically permeable mass.

As depicted, fluid enters via an inlet port 185. The fluid exits via an outlet port 190 when the outlet port 190 is not occluded by the corresponding sealing member 175. When the mass 155 is not registered with (e.g., after being de-registered from) the second linear axis 180B, the corresponding biasing element 171B urges the valve element 170B downwards along the second linear axis 180B so that the sealing element 175B fluidly seals against the outlet port 190B. Accordingly fluid is prevented from exiting through the outlet port 190 B.

As depicted, when the mass 155 is brought into registration with the first linear axis 180A, reluctance-induced forces between the mass 155 and the valve element 170A cause the valve element 170A to travel upward along the first linear axis 180A, compressing the corresponding biasing element 171A. The sealing element 175A is thereby unsealed from the outlet port 190A. Accordingly, fluid can flow from the inlet port 180A to the outlet port 190A.

In the depicted example, continuous rotation of the shaft 145 causes the mass 155 to alternatingly register and deregister with the valve elements 170, causing the valve elements 170 to reciprocate along their respective linear axes 180. Accordingly, a rhythmic output of fluid is alternatingly dispensed from the outlet ports 190. The result, by way of example and not limitation, may be a pulsed output, a cycled on/off output, or some combination thereof.

In the depicted example, the actuator 140 may rotate the shaft 145 such that the mass 155 is brought into registration with the left valve element 170A. The actuator 140 may be de-energized. Reluctance forces between the mass 155 and the valve element 170A may retain the valve 165A in an open position, as shown, with no energy required to maintain the valve open. Similarly, the right valve 165 B is maintained in a closed position, as depicted, by the biasing member 171 B. Accordingly, power input (e.g., electrical) may only be required to operate the actuator 140 to translate the mass 155 in the plane 160. Once in a desired configuration, the valve may require minimal or no further energy input until a change in configuration is desired. Accordingly, various embodiments may, for example, advantageously provide an energy efficient valve. Various embodiments may, for example, advantageously reduce thermal heat generated by the valve 135. Various embodiments may, for example, advantageously extend operating life of the valve 135 by reducing cumulative time of electrical activation (e.g., as compared to a solenoid-actuated valve).

Figure 2:
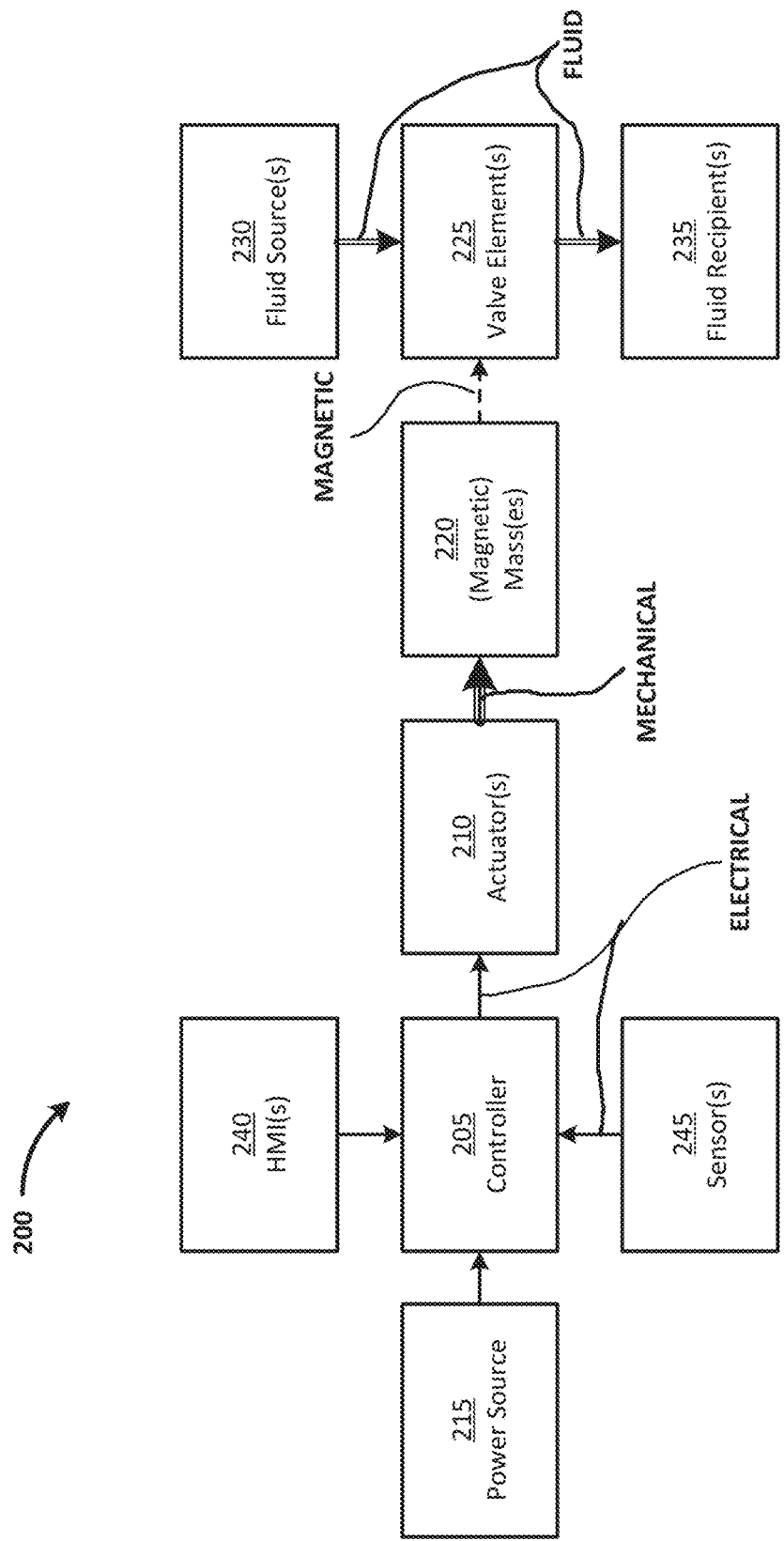
FIG. 2 depicts an exemplary block diagram depicting electrical, magnetic, mechanic, and fluid connections in an exemplary magnetic valve.

FIG. 2 depicts an exemplary block diagram depicting electrical, magnetic, mechanic, and fluid connections in an exemplary magnetic valve. In the depicted system 200, a controller 205 is operatively and electrically coupled to at least one actuator 210. The controller 205 may, by way of example and not limitation, include a (dedicated and/or general-purpose) circuit, processor, switch (e.g., relay), or some combination thereof. The actuator 210 may, by way of example and not limitation, include an electric actuator (e.g., electric motor), hydraulic actuator, pneumatic actuator, or some combination thereof. In the depicted example, the actuator 210 is electrically connected to the power source 215 via the controller 205. Accordingly, the controller 205 may selectively electrically connect the actuator 210 to a power source 215 (e.g., battery, power supply, building power network). In various embodiments the controller 205 may hydraulically, pneumatically, mechanically, and/or electrically connect the power source 215 (e.g., electrical, hydraulic, mechanical, pneumatic) to the actuator 210.

The actuator 210 is mechanically coupled to at least one translatable mass 220. The mass may, for example, be magnetic or non-magnetized magnetically permeable. Accordingly, actuation of the actuator 210 by the controller 205 may cause mechanical motion of the mass 220. The mass 220, as depicted, may be selectively magnetically coupled to at least one valve element 225. For example, as disclosed at least with reference to FIG. 1, registration and/or deregistration of the mass 220 with a corresponding valve element 225 may magnetically couple and/or decouple mass 220 and the valve element 225. The valve element 225 is in fluid communication with at least one fluid source 230 and at least one fluid recipient 235. Accordingly, magnetic coupling and/or decoupling of the mass 220 with the valve element 225 may operate the valve element 225 to fluidly connect or disconnect the fluid source 230 and the fluid recipient 235.

Figure 3:
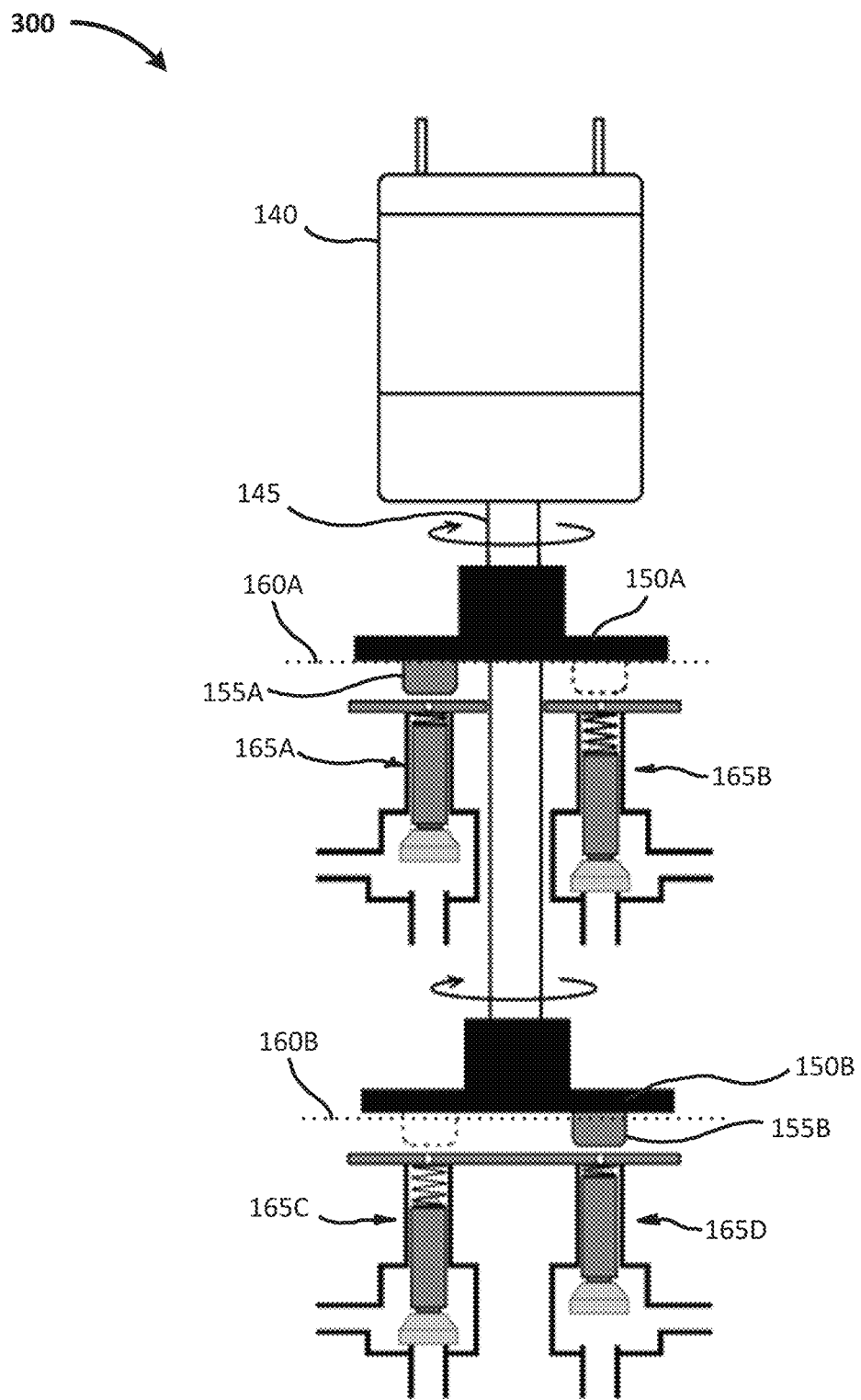
FIG. 3 depicts an exemplary reluctance-coupled magnetic valve having multiple valve units.

FIG. 3 depicts an exemplary reluctance-coupled magnetic valve having multiple valve units. The depicted valve 300 includes the actuator 140 configured to rotate the shaft 145. The shaft 145 is mechanically coupled to a first carriage 150A and a second carriage 150B such that rotation of the shaft 155 causes corresponding rotation of the carriages 150. Each carriage 150 is provided with a corresponding mass 155. Rotation of the carriages 150 causes translation of the corresponding first mass 155A and second mass 155B in a corresponding first plane 160A and second plane 160B, respectively.

The first carriage 150A is configured to selectively activate corresponding valve units 165A and 165B. The second carriage 150B is configured to selectively activate corresponding valve units 165C and 165D. As depicted, the first mass 155A is offset by 180° from the second mass 155B. Accordingly, an output of the first pair of valve units 165A and 165B is phase-shifted by 180° from an output of the second pair of valve units 165C and 165D.

Figure 4A:
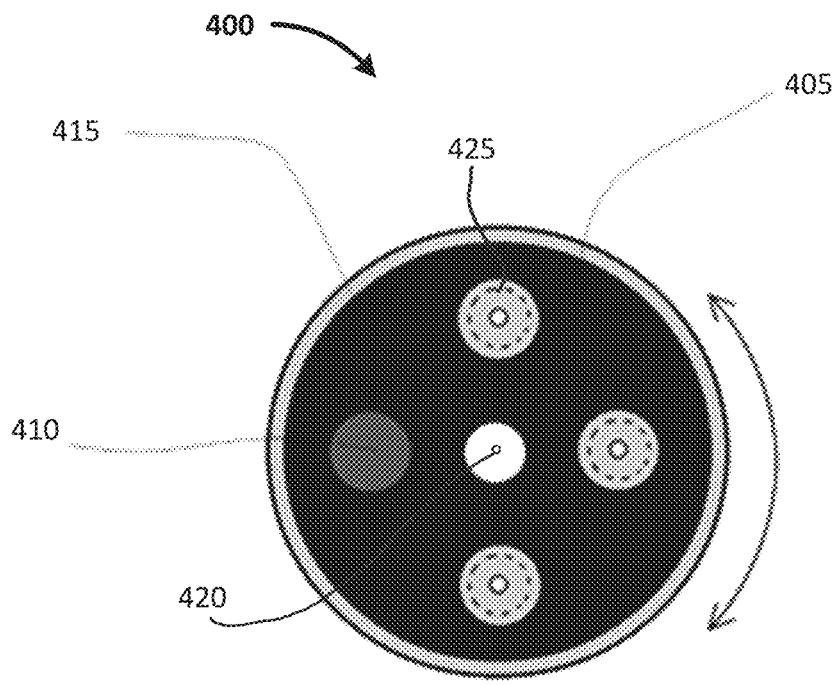
FIG. 4A depicts a top plan view of an exemplary reluctance-coupled magnetic valve having a single rotating mass configured to be brought into subsequent selective registration with multiple valve elements.

FIG. 4A depicts a top plan view of an exemplary reluctance-coupled magnetic valve having a single rotating mass configured to be brought into subsequent selective registration with multiple valve elements. The depicted valve 400 includes a carriage 405 mechanically coupled to a single mass 410. The carriage 405 rotates over a valve body 415 about an axis of rotation 420. Accordingly, the mass 410 may be selectively registered/deregistered with multiple valve units 425 in the valve body 415.

Figure 4B:
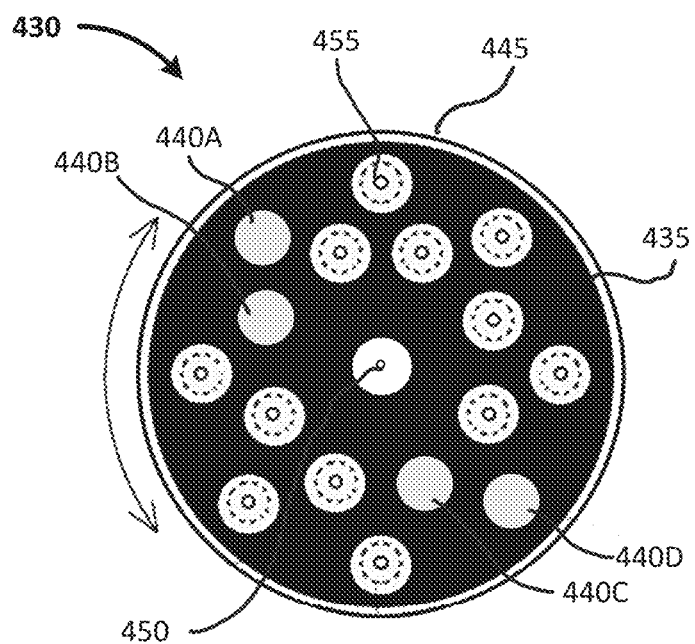
FIG. 4B depicts a top plan view of an exemplary reluctance-coupled magnetic valve having four rotating masses configured to be brought into subsequent selective registration with corresponding sets of multiple valve elements.

FIG. 4B depicts a top plan view of an exemplary reluctance-coupled magnetic valve having four rotating masses configured to be brought into subsequent selective registration with corresponding sets of multiple valve elements. The depicted valve 430 includes a carriage 435 mechanically coupled to four masses 440A, 440D, 440C, and 440D. The carriage 435 rotates over a valve body 445 about an axis of rotation 450. Accordingly, the masses 440 are selectively registered/deregistered with corresponding valve units 455 about body 445.

Figure 5:
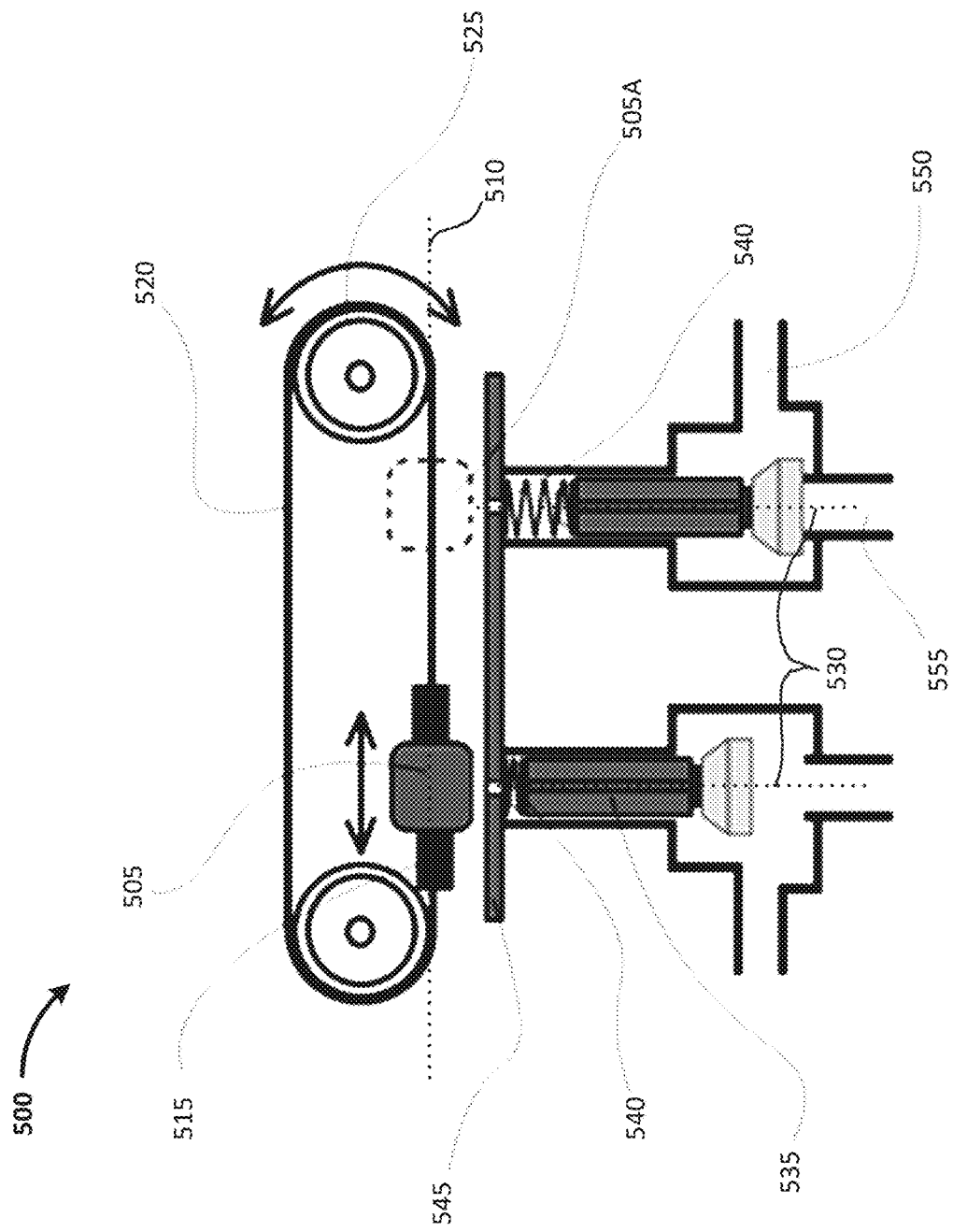
FIG. 5 depicts an exemplary reluctance-coupled magnetic valve having a first plane substantially orthogonal to linear axes of corresponding valve elements.

FIG. 5 depicts an exemplary reluctance-coupled magnetic valve having a first plane substantially orthogonal to linear axes of corresponding valve elements. The depicted valve 500 includes a mass 505 configured to be translated in a first plane 510. The mass 505 is mechanically coupled (e.g., disposed in, adhered to, mounted on) with a carriage 515. The carriage 515 is coupled to a track (e.g., belt, cable, cord, chain, filament) 520. The tract 520 is driven by rotating elements 525. At least one of the rotating elements 525 may be powered, may be driven by an actuator (e.g., by at least one belt, cable, cord, chain, shaft, collar, gear), or some combination thereof.

Rotating elements 525 may be operated to translate the mass 505 in the plane 510 to register the mass 505 with a linear axis 530 of a valve element 535. Registration of the mass 505 and the valve element 535 may induce reluctance-induced forces between the mass 505 and the valve element 535. The forces may be aligned along the linear axis 530 such that the valve element 535 is translated upwards along the linear axis 530, compressing a biasing element (e.g., spring) 540. Accordingly, the valve element may be operated into an open position, such that a first port 550 and a second port 555 are in fluid communication.

Similarly, translation of the mass 505 from a previous location A deregisters the mass 505 and the corresponding valve element 535. A corresponding biasing number 540 urges the valve element 535 downwards along the corresponding linear axis 530. Accordingly, deregistration of the mass 505 and the (right) valve element 535 causes the valve element 535 to be operated into a closed position which fluidly separates corresponding ports 550 and 555.

Figure 6A:
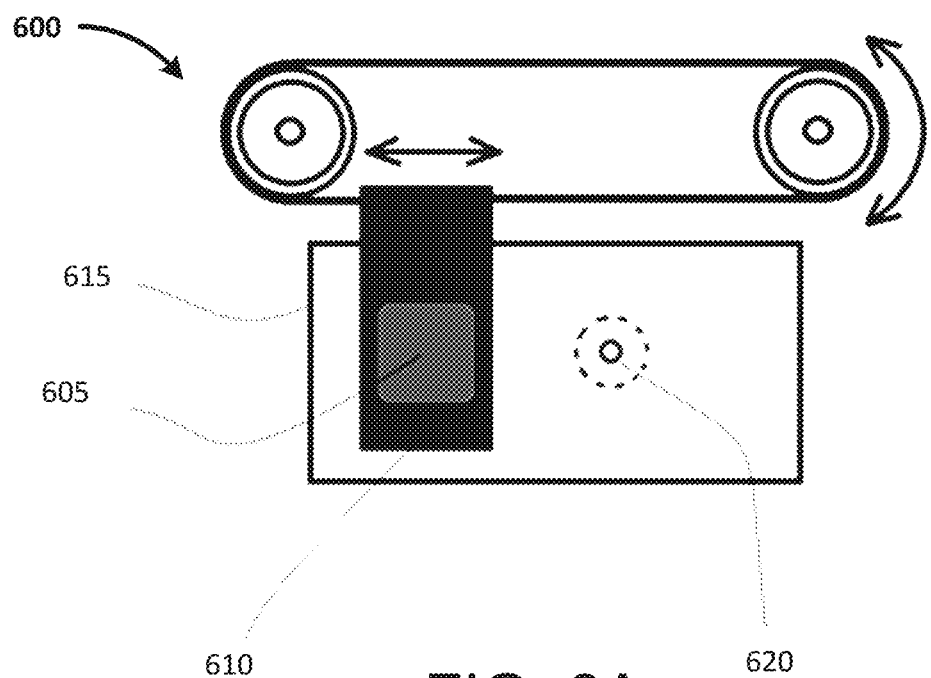
FIG. 6A depicts an exemplary reluctance-coupled magnetic valve having a mass translating carriage extending from an actuator assembly.

FIG. 6A depicts an exemplary reluctance-coupled magnetic valve having a mass translating carriage extending from an actuator assembly. In the depicted valve 600, a mass 605 is disposed on and/or in a translatable carriage 610, such as is disclosed at least with reference to FIGS. 1 and 3-5B. A valve body 615 is provided with at least one valve element 620. The carriage 610 is configured to translate the mass 605 in a plane such that the mass is translated into and/or out of registration with a linear axis (e.g., orthogonal to the plane of translation of the mass 605) corresponding to each valve element 620.

Figure 6B:
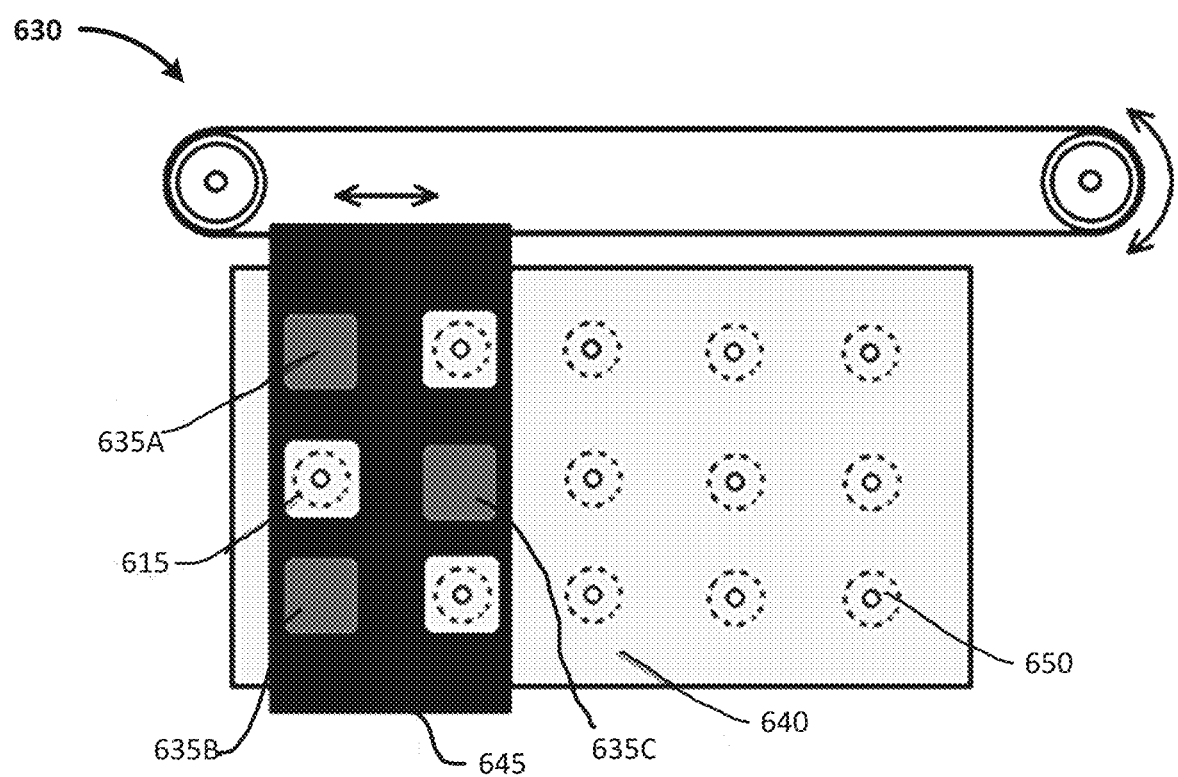
FIG. 6B depicts an exemplary reluctance-coupled magnetic valve having a carriage provided with an array of three configured to be brought into subsequent selective registration with corresponding sets of multiple valve elements.

FIG. 6B depicts an exemplary reluctance-coupled magnetic valve having a carriage provided with an array of three configured to be brought into subsequent selective registration with corresponding sets of multiple valve elements. In the depicted valve 630, masses 635A, 635B, and 635C are disposed on and/or in a carriage 645, such as is disclosed at least with reference to FIGS. 1 and 3-6A. A valve body 645 is provided with at least one valve element 650. The carriage 645 is configured to translate the masses 635 in a plane 640 such that the masses 635 are translated into and/or out of registration with linear axes (e.g., orthogonal to the plane of translation of the masses 635) corresponding to valve elements 650.

Figure 7:
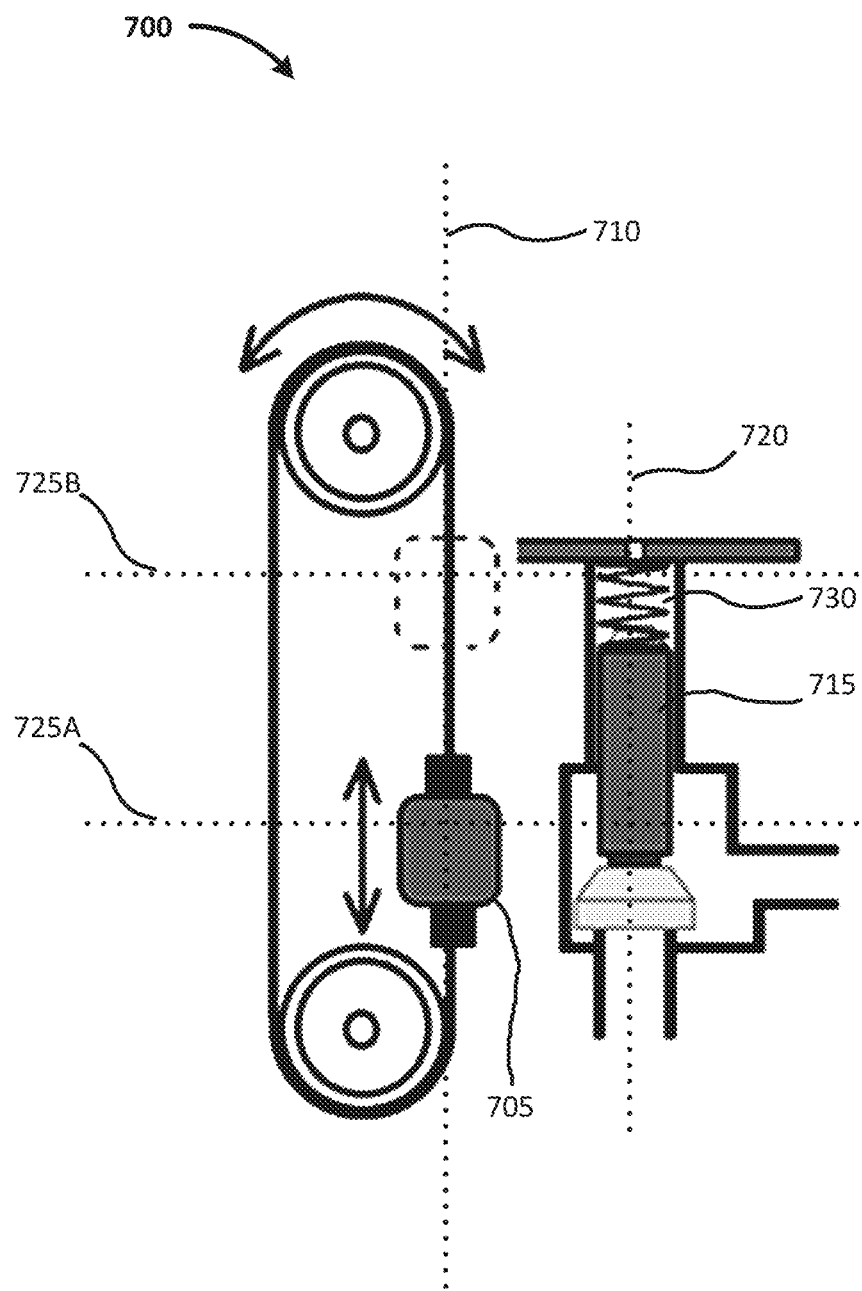
FIG. 7 depicts an exemplary reluctance-coupled magnetic valve having a first plane substantially parallel to a linear axis of a valve element.

FIG. 7 depicts an exemplary reluctance-coupled magnetic valve having a first plane substantially parallel to a linear axis of a valve element. A mass 705 is configured to be translated in a first plane 710. A valve element 715 is configured to translate along a first linear axis 720. The first plane 710 is substantially parallel to the first linear axis 720. When the mass 705 is registered with a second linear axis 725A (depicted as substantially orthogonal to the first linear axis 720 and the plane 710), then reluctance-induced forces magnetically couple the mass 705 and the valve element 715 to translate the valve element 715 downwards along the first linear axis 720 and into a closed position.

When the mass 705 is translated in the plane 710 to register with a third linear axis 725B (depicted as substantially parallel to the second linear axis 725A), then a biasing member 730 urging the valve element 715 downwards along the first linear axis 720 is compressed. As the biasing member 730 (e.g., a compression spring) is compressed, a biasing force may increase. For example, a biasing force may be defined by Fs=k×x, where Fs is the force applied to the valve element 715 by the biasing member 730, k is a spring constant, and x is a displacement distance along the first linear axis 720 from an uncompressed length of the biasing member 730. As the mass is translated upwards towards the third linear axis 725B, Fs may increase until it exceeds forces, induced by reluctance (e.g., magnetic coupling) between the mass 705 and the valve element 715, urging the valve element to travel upwards along the first linear axis 720. Accordingly, when Fs exceeds the reluctance-induced forces, the mass 705 and the valve element 715 may be decoupled. In the depicted example, the mass 705 and the valve element 715 may decouple at least as the mass 705 is brought into registration with the third linear axis 725B.

Figure 8:
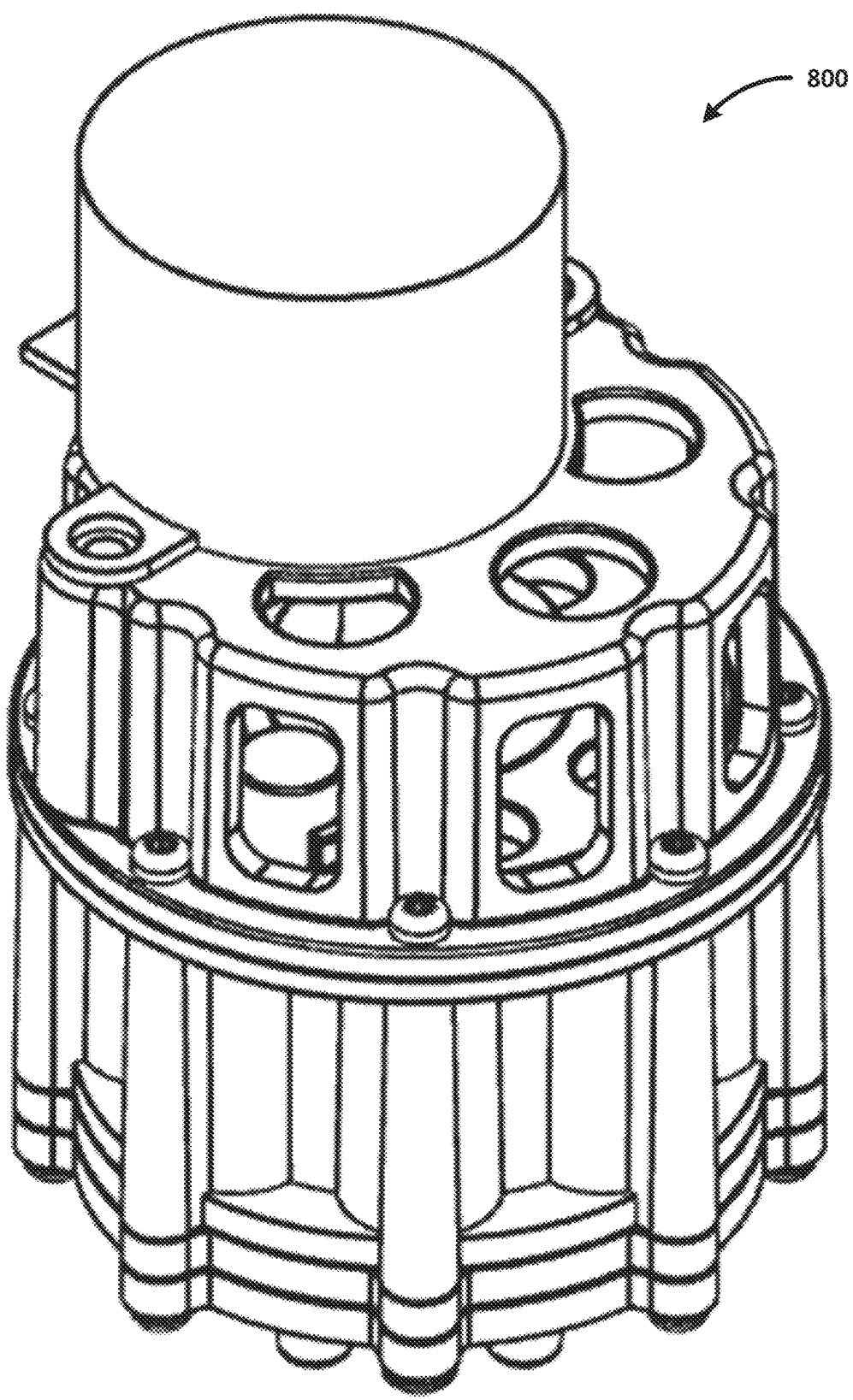
FIG. 8 depicts a perspective view of an exemplary reluctance-coupled magnetic valve.
Figure 9:
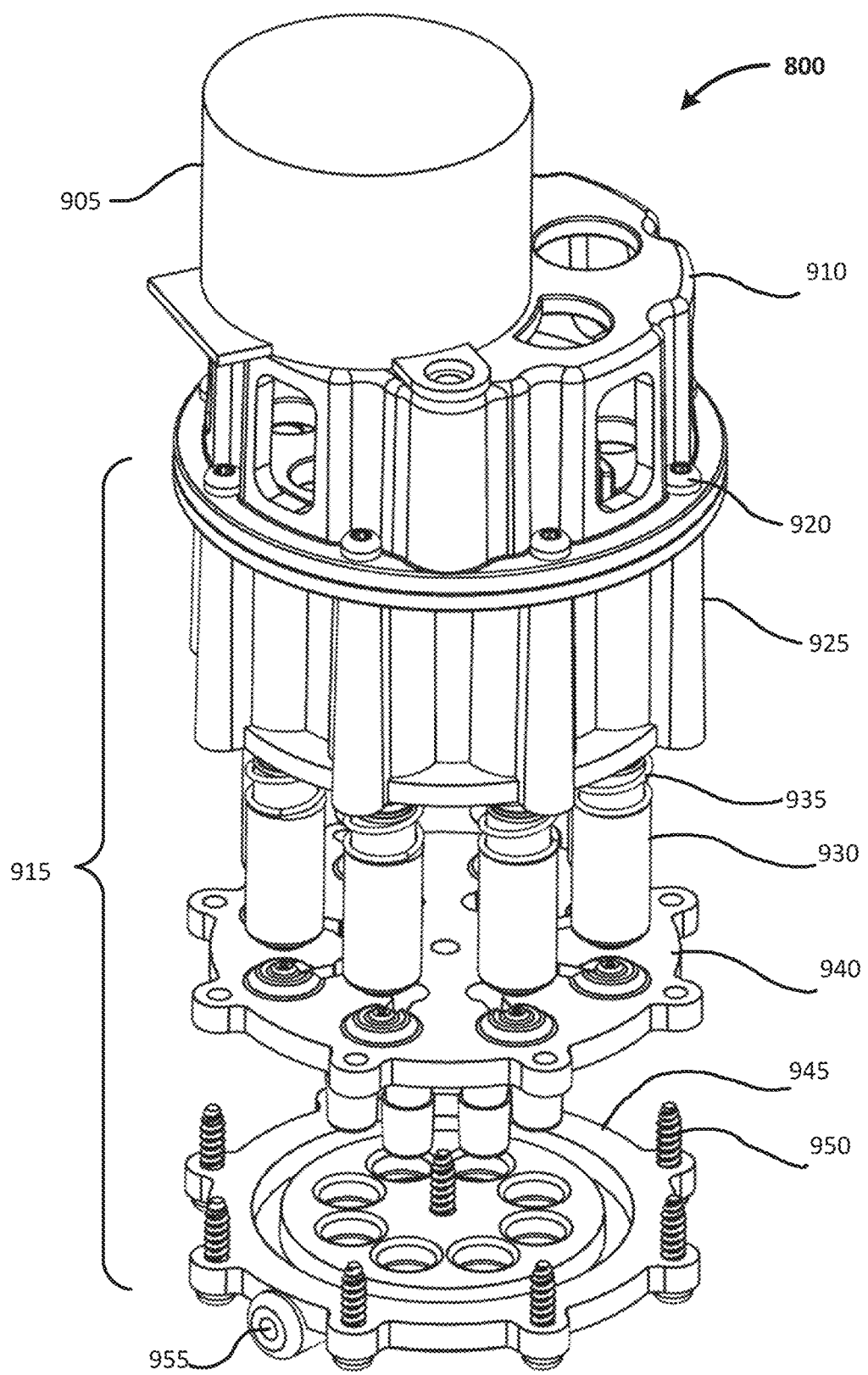
FIG. 9 depicts an exploded view of the exemplary valve of FIG. 8.

FIG. 8 depicts a perspective view of an exemplary reluctance-coupled magnetic valve. FIG. 9 depicts an exploded view of the exemplary valve of FIG. 8. The depicted exemplary valve 800 is provided with a rotary (electric) actuator 905. The actuator 905 may, by way of example and not limitation, be a stepper motor, servo motor, induction motor, DC motor, AC motor, or some combination thereof. The actuator 905 is coupled to a support housing 910. The support housing 910 is coupled to a valve assembly 915. As depicted, the support housing 910 is coupled by coupling members (e.g., permanent, releasable) 920 to a valve body 925 of the valve assembly 915. The valve body 925 is provided with multiple chambers which receive corresponding valve elements 930. When assembled, each valve element 930 engages a corresponding biasing member (e.g., a compression spring) 935. The valve elements 930 and corresponding biasing members 935 may be releasably retained within the valve body 925 by a valve tray 940. As depicted, the valve tray 940 is retained against the valve body 925 by coupling a manifold 945 against the tray 940 by coupling members 950 engaging the valve body 925. The manifold 945 is provided with a fluid port 955.

Figure 10:
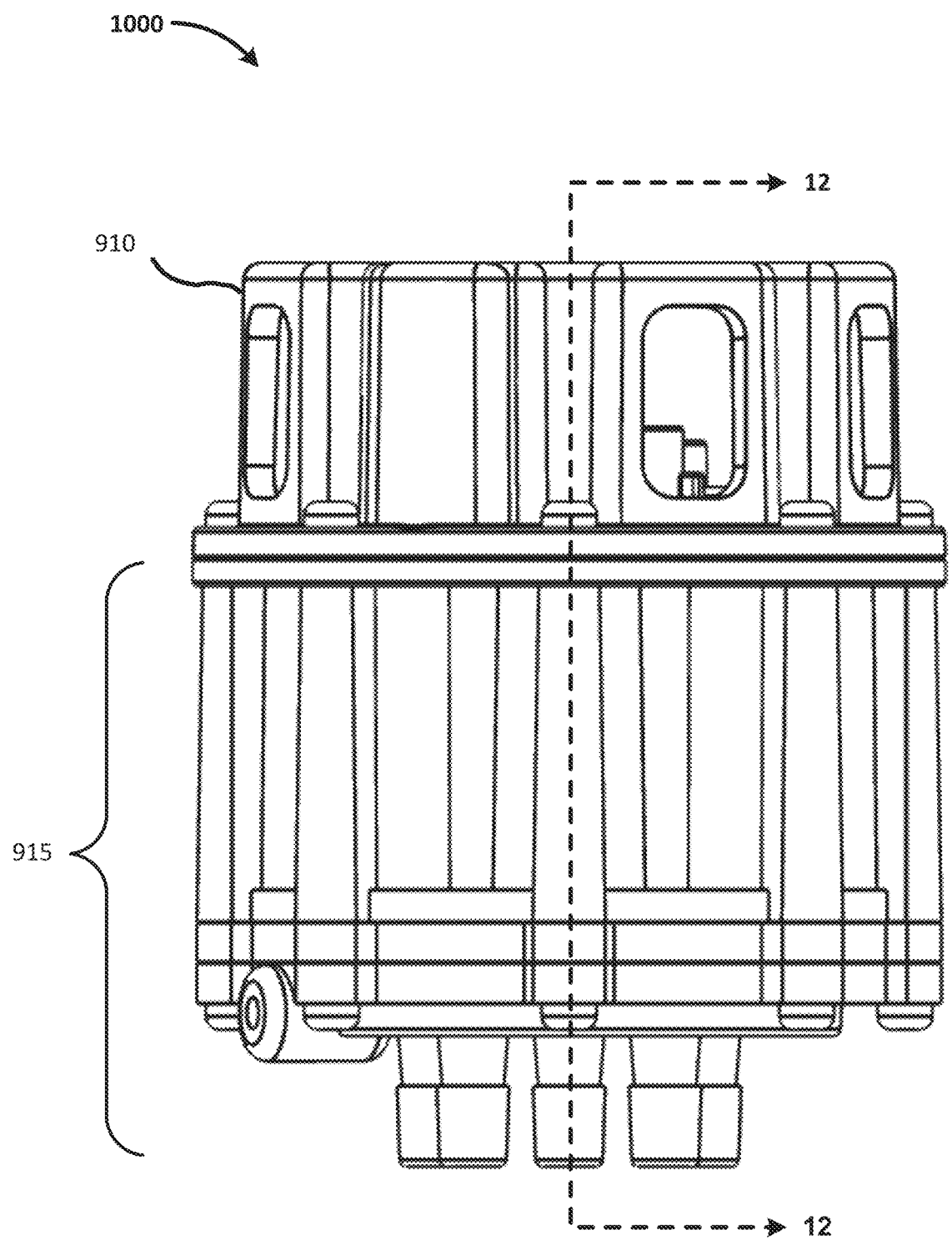
FIG. 10 depicts an elevation view of the exemplary valve of FIG. 8.

FIG. 10 depicts an elevation view of the exemplary valve of FIG. 8. The valve 1000 includes the support housing 910 and the valve assembly 915.

Figure 11A:
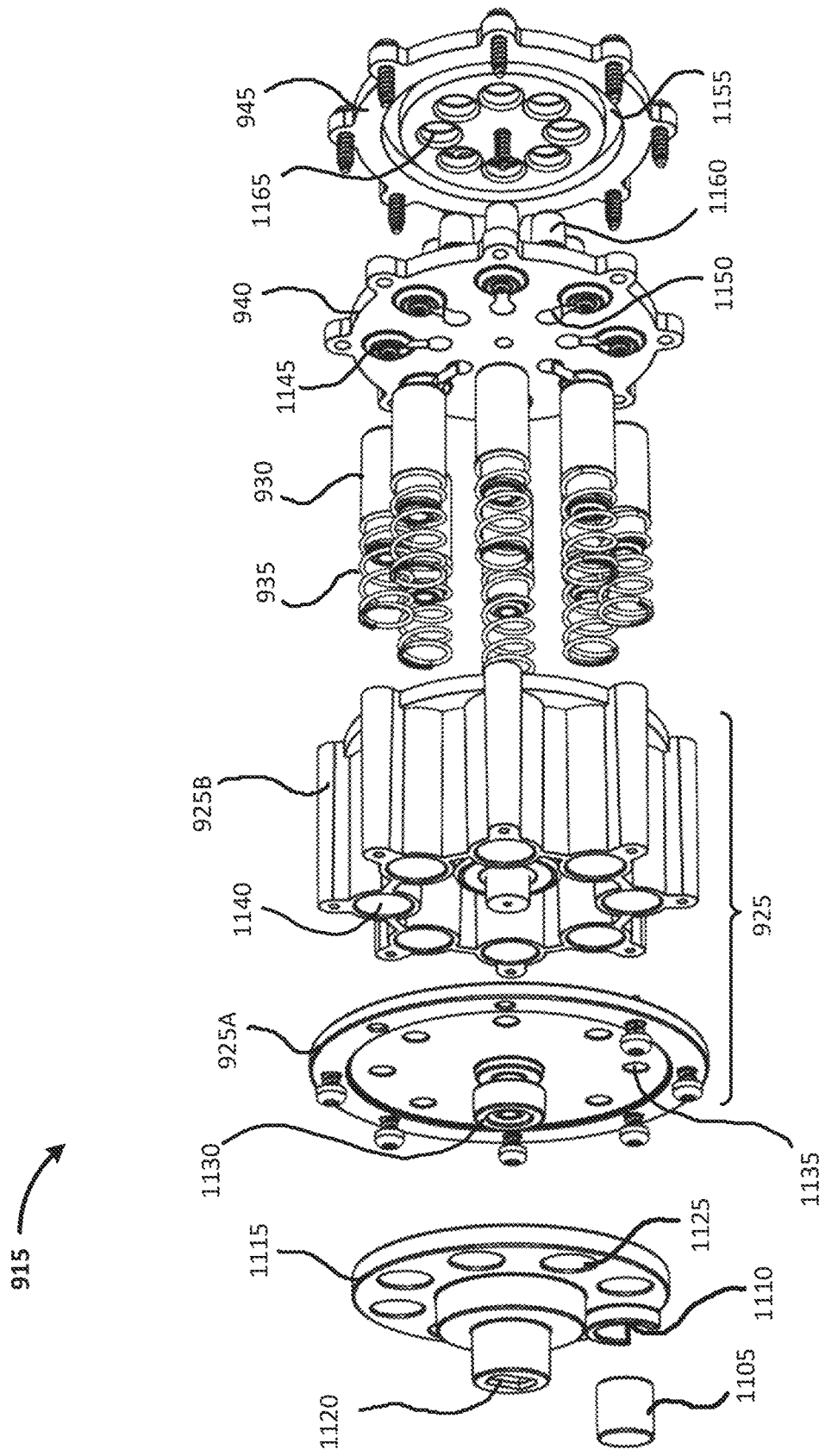
FIG. 11A and FIG. 11B depicts an exploded view of the exemplary valve of FIG. 8 without an actuator motor.
Figure 11B:
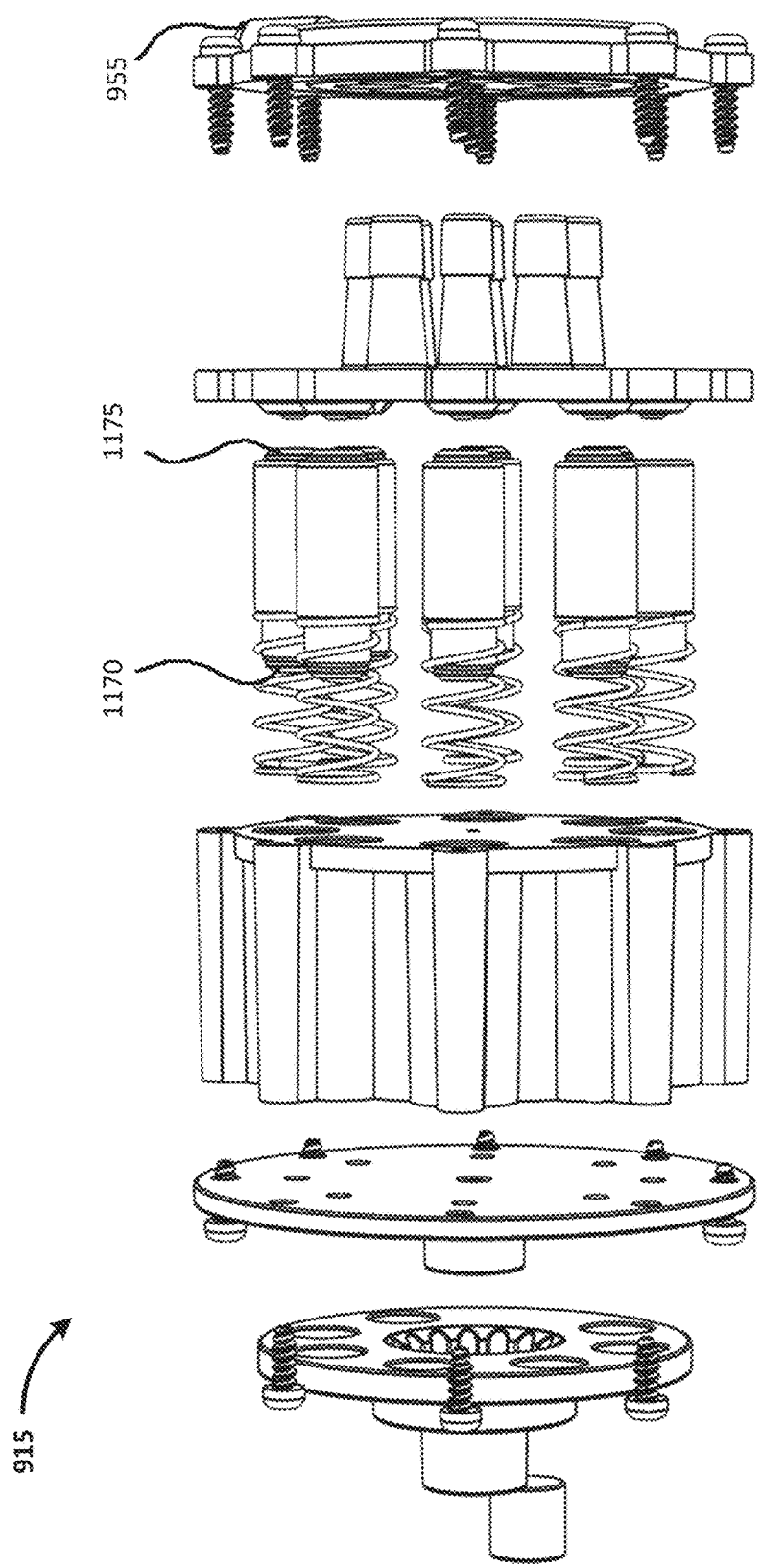

FIG. 11A and FIG. 11B depicts an exploded view of the exemplary valve of FIG. 8 without an actuator motor. As depicted, the valve assembly 915 includes a translatable mass 1105. The mass 1105 may, by way of example and not limitation, be a permanent magnet (e.g., magnetized ferrous material, rare earth magnet, or some combination thereof). The mass 1105 is releasably coupled within a cavity 1110 of a rotatable carriage 1115. The carriage 1115 is provided with a drive feature 1120. The drive feature 1120 may receive, for example, a shaft of the actuator 905 such that the actuator 905 may rotate the carriage 1115. Rotation of the carriage 1115 may translate the mass 1105 about a curvilinear path defined by a radius extending from an axis of rotation passing through the drive feature 1120.

The carriage 1115 is rotatably disposed on (e.g., coupled to) the valve body 925 by a bearing element (e.g., bushing, ball bearing, needle bearing, cylinder bearing) 1130. As depicted, the valve body 925 includes a body cap 925A and a main body 925B. The cap 925A is provided with apertures 1135. The apertures 1135 may align with corresponding cavities 1140 in the main body 925B. The cavities 1140 may be substantially evenly circumferentially distributed about the axis of rotation at a constant radius from the axis of rotation.

As depicted, each cavity 1140 slidingly receives a corresponding biasing member 935 and valve element 930. When assembled, the biasing member may engage the cap 925A. The tray 940 is provided with seats 1145 and channels 1150 corresponding to each of the cavities 1140 and/or valve elements 930. When assembled, each channel 1150 may be in fluid communication with a channel 1155 of the manifold 945. As depicted, each seat 1145 is provided with an aperture therethrough in fluid communication with a corresponding conduit 1160. The conduit 1160 may, by way of example and not limitation, be integrally formed with the tray 940. The manifold 945 is provided with apertures 1165 corresponding to the conduits 1160 such that the conduits 1160 may be received therethrough when the valve assembly 915 is assembled.

As depicted at least with reference to FIG. 11B, each valve element 930 is provided with a first sealing member 1170 and a second sealing member 1175. Each sealing member 1170 and/or 1175 may, for example, be at least partially constructed of compliant (e.g., flexible, elastomeric) material. The first sealing member 1170 may seal against the cap 925A (e.g., occluding fluid communication with the corresponding aperture 1135). The second sealing member 1175 a seal against the corresponding seat 1145 (e.g., occluding access fluid communication with the channel 1155 of the manifold 945.

Figure 12:
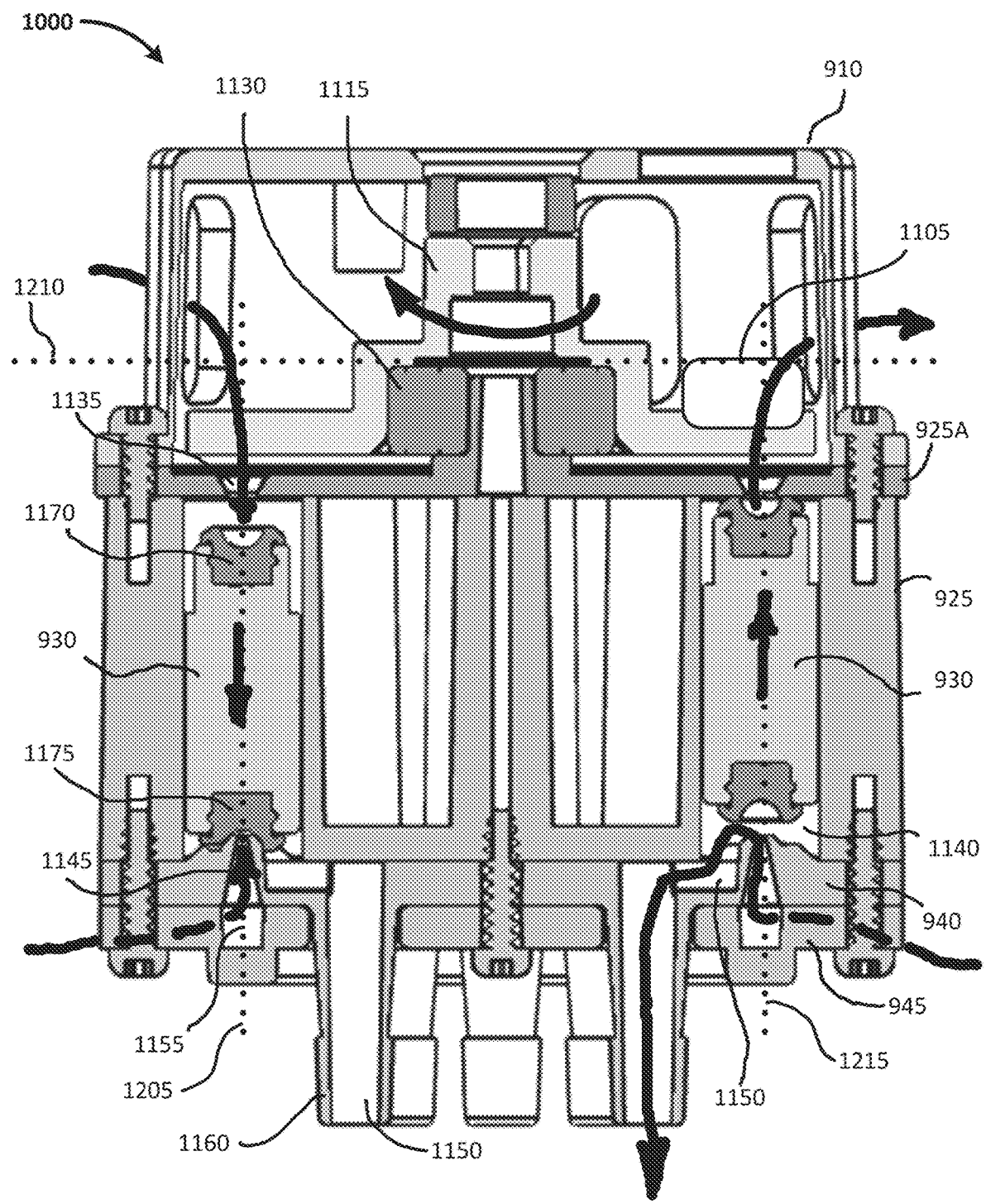
FIG. 12 depicts a cross-section view of the exemplary valve of FIG. 10.
Figure 13:
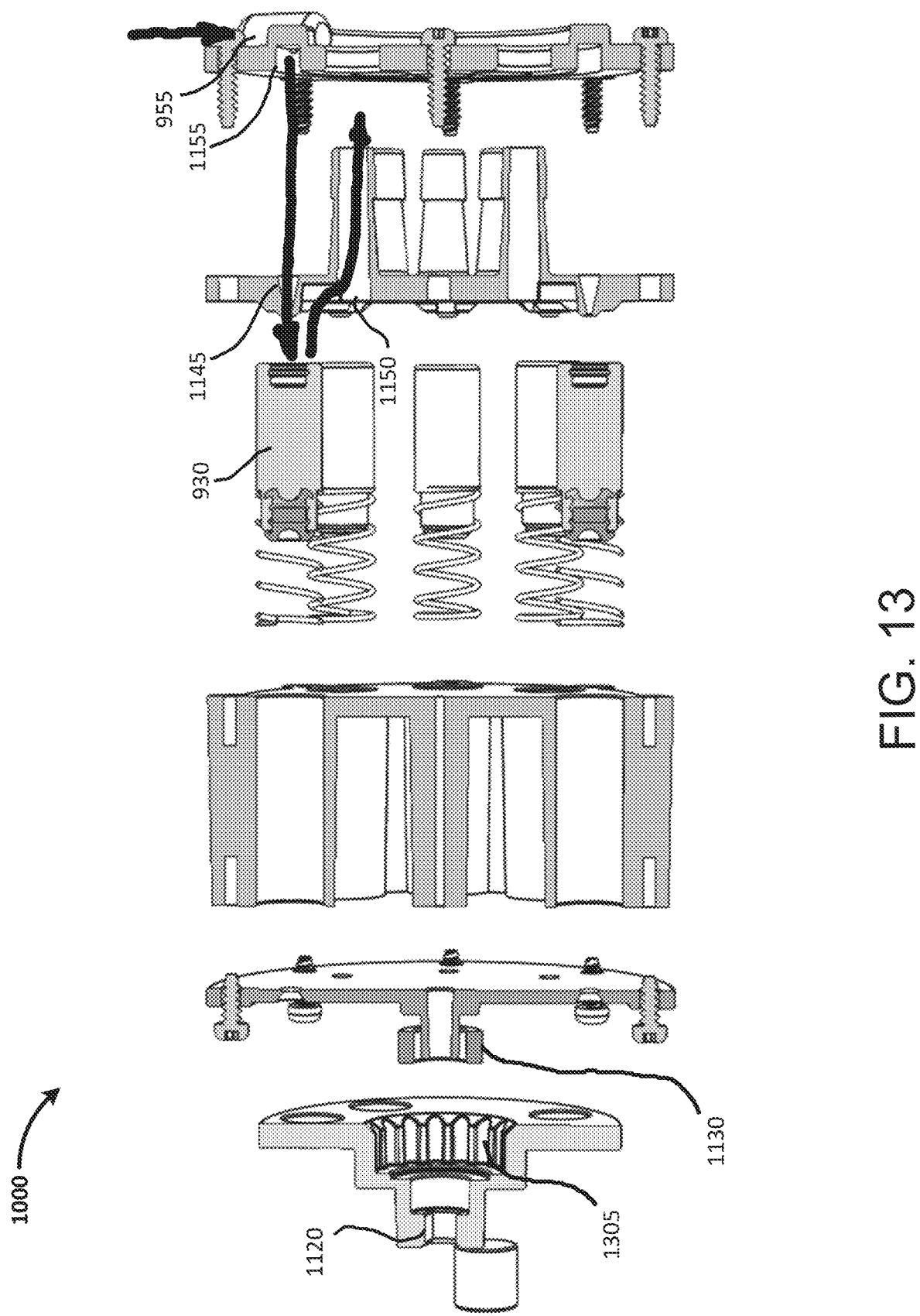
FIG. 13 depicts an exploded cross-section view of the exemplary valve of FIG. 10.

FIG. 12 depicts a cross-section view of the exemplary valve of FIG. 10. FIG. 13 depicts an exploded cross-section view of the exemplary valve of FIG. 10. In FIG. 12, the valve 1000 is depicted with the left valve element 930 in a first (e.g., closed) mode in a corresponding cavity 1140 of the body 925, and the right valve element 930 in a second (e.g., open) mode in a corresponding cavity 1140. As depicted, the carriage 1115 has been rotated about the bearing element 1130 (e.g., by the actuator 905) such that the mass 1105 has been translated in a plane 1210 out of registration with a (longitudinal) linear axis 1205 of the left valve element 930. A corresponding biasing member 935 (not shown) urges the valve element 930 downwards along the linear axis 1205. As the valve element 930 moves downward, air is drawn into the cavity 1140 from the support housing 910 through the corresponding aperture 1135 in the cap 925A. Accordingly, a vacuum may, for example, be prevented. Accordingly, a closing force of the valve element 930 applied by the biasing member 935 may be advantageously maintained.

The valve element 930 may be in slidable, sealing communication with the walls of the cavity 1140. For example, valve element 930 may substantially prevent fluid of interest (e.g., water, air, body fluid) from passing around the valve element 930 between a portion of the cavity 1140 above the valve element 930 and below the valve element 930. Accordingly, valve element 930 may substantially prevent fluid communication between a portion of the cavity 1140 above the valve element 930, and a portion of the cavity 1140 below the valve element 930. The valve element 930 may slidable lease seal against the walls of the cavity 1140 by, by way of example and not limitation, a sealing member (e.g., O-ring), close sliding fit, or some combination thereof.

When the valve element 930 reaches an extent of travel downward in the cavity 1140 along the linear axis 1205, the corresponding second sealing member 1175, may sealingly engage the seat 1145 of the tray 940. Accordingly, as depicted, incoming fluid from the (inlet) port 955, through the tray 1155 of the manifold 945, and into the lumen formed in the seat 1145, may be occluded. Thereby, the corresponding channel 1150 in the tray 940 may be advantageously separated from fluid communication with the incoming fluid from the seat 1145. In various embodiments the fluid direction may, by way of example and not limitation, be reversed such that fluid is incoming through the channels of the tray 940 and outgoing through the port 955.

As depicted, the carriage 1115 has been rotated about the bearing element 1130 such that the mass 1105 has been translated in a plane 1210 into registration with a (longitudinal) linear axis 1215 of the right valve element 930. Reluctance-induced forces are induced by magnetic coupling of the mass 1105 and the right valve element 930. The reluctance induced forces urge the valve element 930 upwards along the linear axis 1215. As depicted, fluid (e.g., air) in the corresponding cavity 1140 escapes out of the corresponding aperture 1135 in the cap 925A and thence out of the support housing 910. Accordingly, back pressure may be advantageously reduced or eliminated against the upward motion of the valve element 930. Once the valve element 930 is at its uppermost extent along the linear axis 1215, the upper sealing element 1170 may seal around the aperture 1135 of the cap 925A. At its uppermost extent, the valve element 930 is in the second (e.g., open) mode. The lower sealing element 1175 is separated from the corresponding seat 1145. Accordingly, the channel 1155 and aperture of the seat 1145 is in fluid communication with the corresponding channel 1150 via the cavity 1140. As depicted, fluid flows from the (inlet) port 955 (not shown) through the channel 1155 of the manifold 945, through the lumen of the seat 940, into the cavity 1140, and out through the corresponding channel 1150 of the tray 940. Accordingly, translation of the mass 1105 (e.g., a permanent magnet) in the plane 1210 may advantageously selectively provide fluid communication between at least one inlet port and at least one outlet port. In various embodiments, fluid may flow in an opposite direction.

As depicted in FIG. 13, the carriage 1115 is provided for the cavity 1305. The cavity 1305 may, for example, couple to the bearing element 1130. As depicted, the cavity 1305 is provided with splines extending radially inwards from the carriage 1115 into the cavity 1305. The splines may, for example, pressingly engage with the bearing element 1130. For example, the cavity 1305 of the carriage 1130 may press-fit over the bearing 1130, thereby coupling the carriage 1115 to the bearing element 1130. The bearing element 1130 may, for example, releasably or permanently couple to the cap 925A. As depicted, the cap 925A is provided with a shaft (e.g., separate, integrally formed) extending axially from the cap 925A. The bearing 1130 fits over the shaft 925A. In various embodiments the bearing may be mounted by a shaft, by insertion into a cavity, by coupling via a housing and/or bracket, or some combination thereof.

Figure 14B:
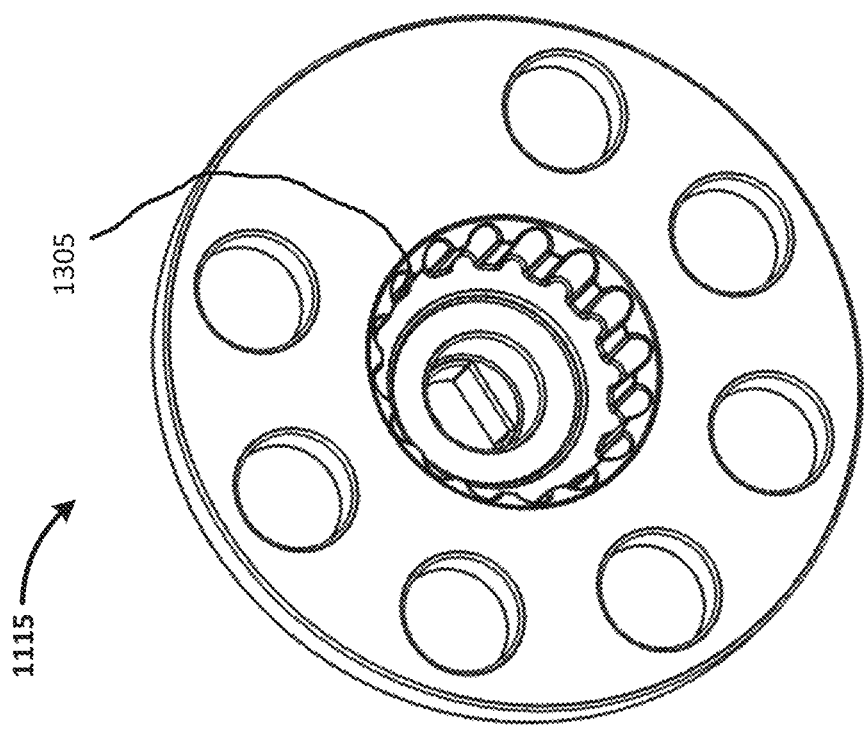
FIG. 14A and FIG. 14B depict an exemplary translating mass carriage of the exemplary valve of FIG. 10.
Figure 14A:
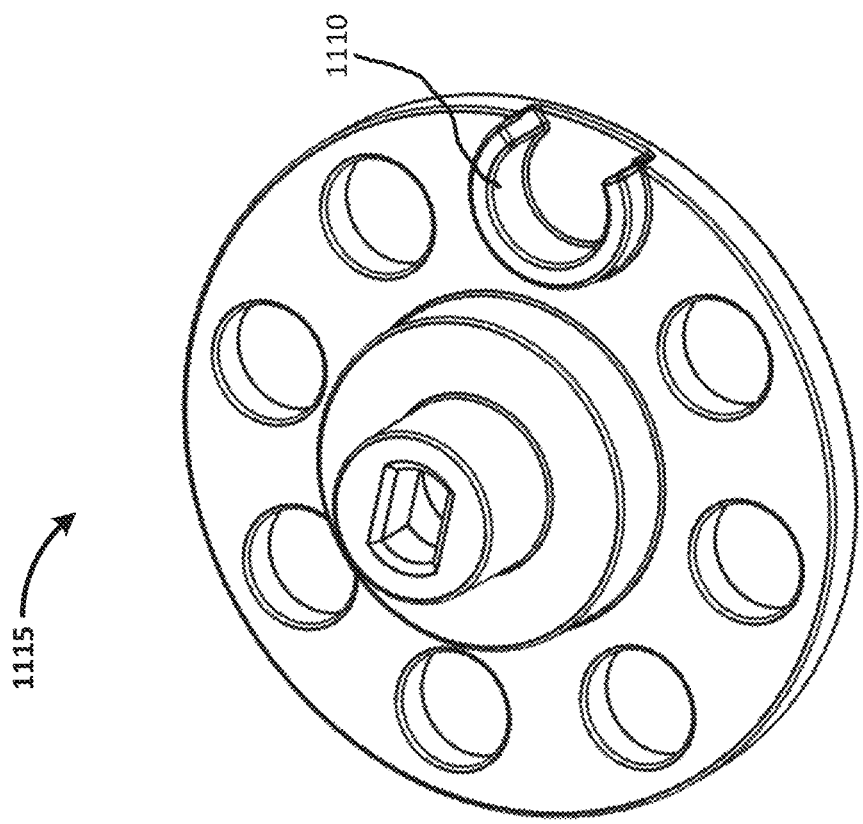

FIG. 14A and FIG. 14B depict an exemplary translating mass carriage of the exemplary valve of FIG. 10.

Figure 15:
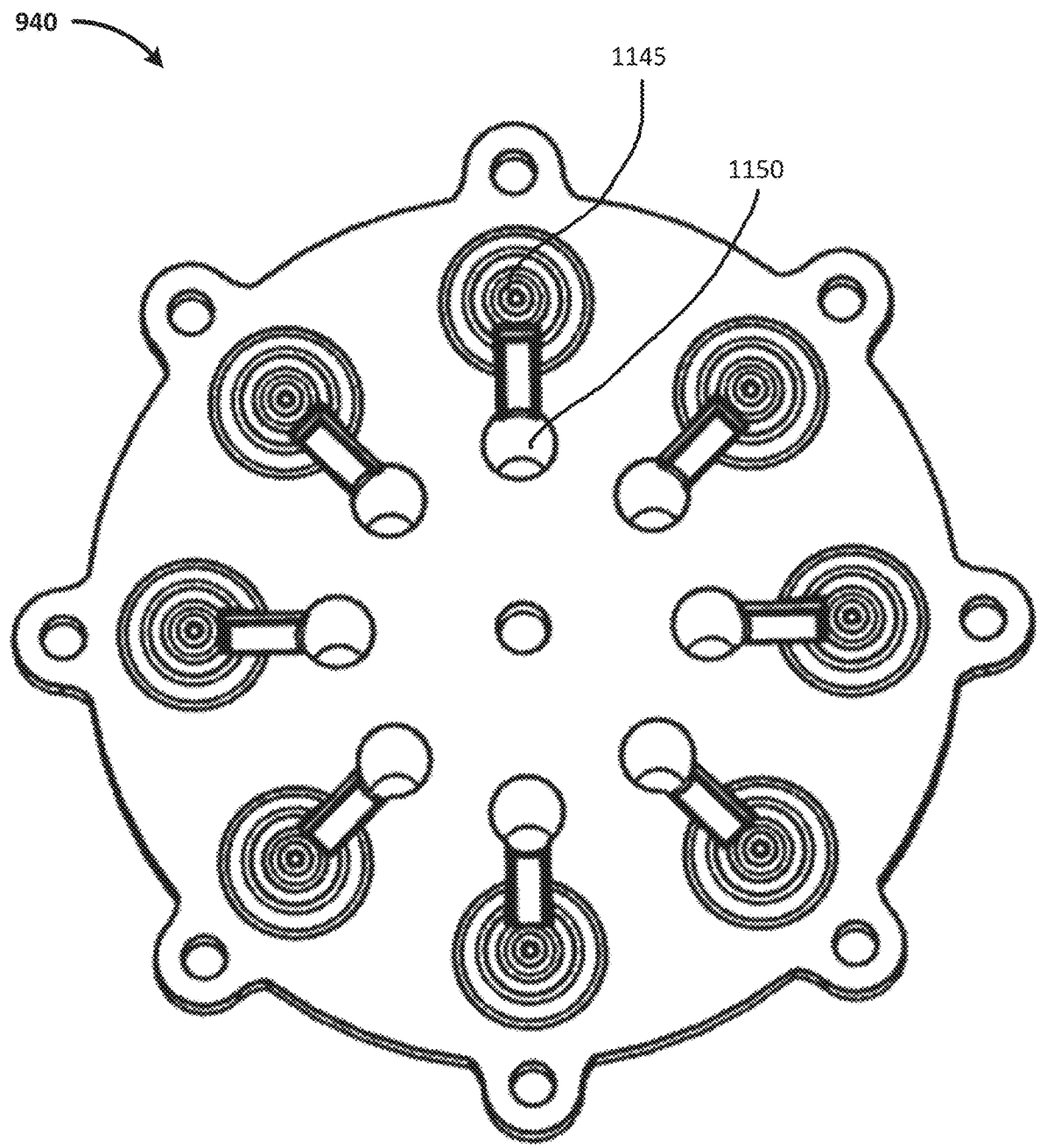
FIG. 15 depicts an exemplary valve tray of the exemplary valve of FIG. 10.

FIG. 15 depicts an exemplary valve tray of the exemplary valve of FIG. 10.

Figure 16A:
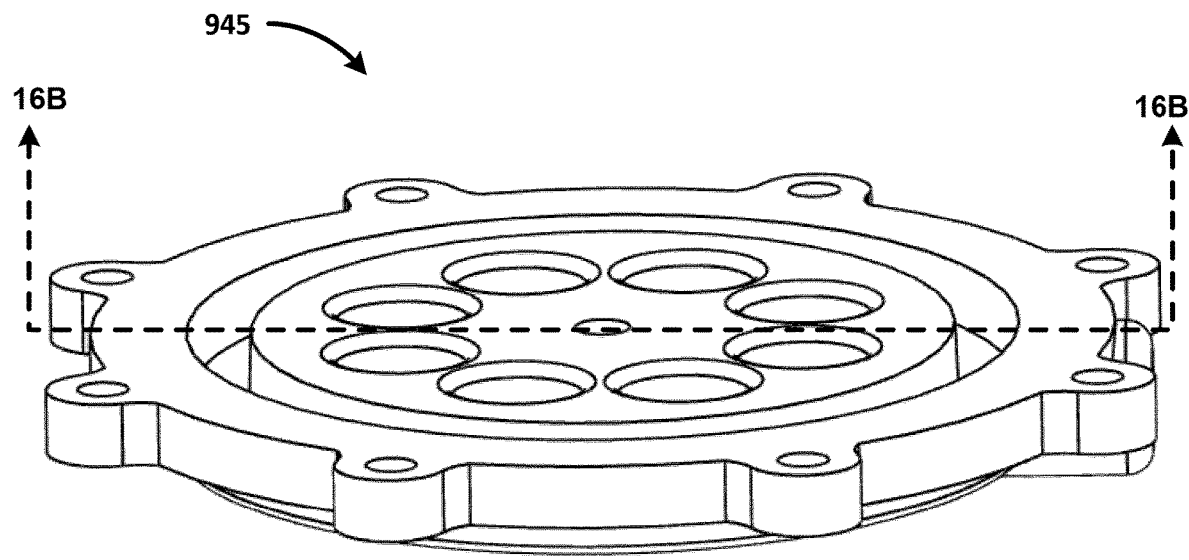
FIG. 16A and FIG. 16B depict an exemplary manifold of the exemplary valve of FIG. 10.
Figure 16B:
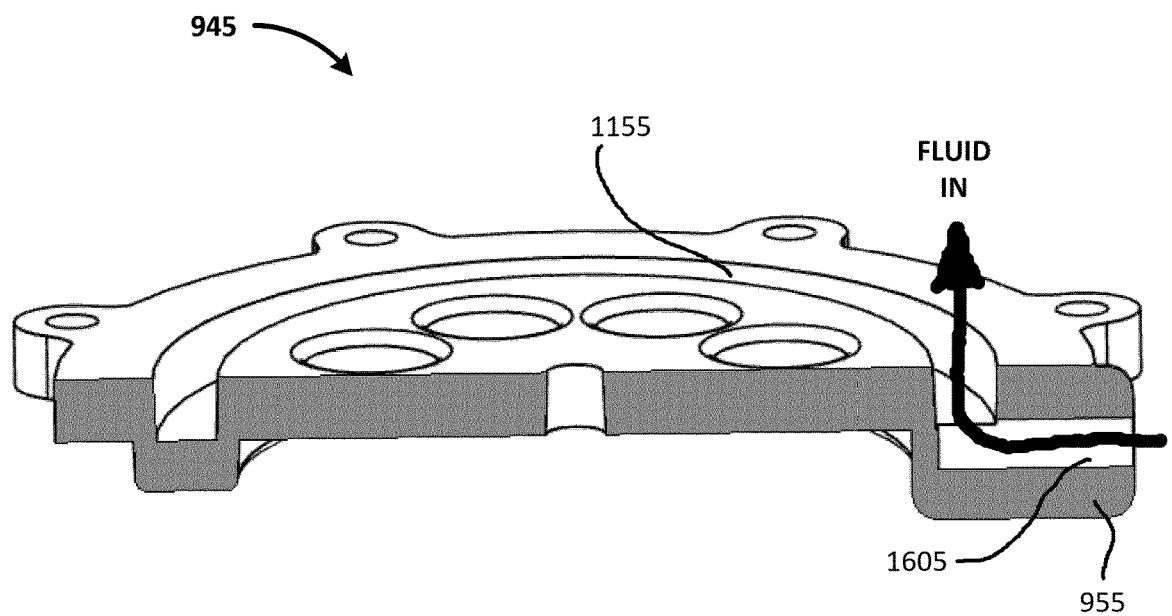

FIG. 16A and FIG. 16B depict an exemplary manifold of the exemplary valve of FIG. 10. As depicted, the port 955 is provided with a lumen 1605. Fluid (e.g., gas, liquid) may flow in and/or out of the valve through the lumen 1605. The lumen 1605 is in fluid communication with the channel 1155 of the manifold 945. As disclosed at least with reference to FIG. 12, the channel 1155 may be in fluid communication with individual lumens of corresponding seats 1145. The lumens of the seats 1145 may be in selective individual communication with corresponding channels 1140 of the body 925 depending on a current mode of the corresponding valve elements 930 (e.g., first mode, second mode). When the lumen of any given seat 1145 is in fluid communication with the corresponding channel 1140 (e.g., when the valve element 930 is in the second mode), then the lumen may be in fluid communication with a corresponding channel 1150 of the tray 940 via the corresponding cavity 1140. Accordingly, selective fluid communication may be provided between inlet and outlet ports.

Although various embodiments have been described with reference to the figures, other embodiments are possible. For example, although an exemplary system has been described with reference to the figures, other implementations may be deployed in other industrial, scientific, medical, commercial, and/or residential applications. Various embodiments may be used, by way of example and not limitation, in medical, personal and/or household equipment. Various embodiments may be deployed, by way of example and not limitation, to control air flow, gases, vapors, liquids, slurries, powders, granules, other appropriate flowable material(s), or some combination thereof. Various embodiments may, by way of example and not limitation, be advantageously deployed in vaporizers, inflatable mattresses, automatic massage devices, lymphatic drainage equipment, or some combination thereof.

In various embodiments, compound translation of a mass may be generated. For example, rotational and/or linear motions may be combined to create compound motions of at least one mass. Various such embodiments may advantageously allow, for example, for control of valve arrays that are not ideally positioned to allow for the actuation using just a single type of motion.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as batteries, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A valve comprising:
   an actuator configured to translate at least one mass along a curvilinear mass in a first plane; and,
   at least one valve element located out of the first plane and configured to translate along a first linear axis,
   wherein the at least one mass comprises a magnetic source providing a persistent magnetic field and the and the at least one valve element comprises a non-magnetized, magnetically permeable mass such that, when at least one of the masses is brought into register with a second linear axis, reluctance-induced forces translate the corresponding valve element towards the mass along the first linear axis.

2. The valve of claim 1, wherein at least one of the at least one mass and the at least one valve element comprises a ferrous material.

3. The valve of claim 1, wherein the first linear axis is substantially parallel to the first plane.

4. The valve of claim 1, wherein the first linear axis is substantially orthogonal to the first plane.

5. The valve of claim 1, wherein the first linear axis is colinear with the second linear axis.

6. The valve of claim 1, wherein the first linear axis is substantially orthogonal to the second linear axis.

7. The valve of claim 1, wherein:
   the at least one valve element comprises a first plurality of valve elements,
   each of the first plurality of valve elements are located out of the first plane and are configured to translate along a corresponding linear axis.

8. The valve of claim 7, further comprising a carrier, wherein:
   the at least one mass comprises a first plurality of masses,
   the carrier is configured to translate the first plurality of masses in the first plane, and,
   each of the first plurality of masses is configured to register with at least one of the linear axes corresponding to the first plurality of valve elements.

9. A valve comprising:
   an actuator configured to translate at least one mass in a first plane; and,
   at least one valve element located out of the first plane and configured to translate along a first linear axis,
   wherein at least one of the at least one mass and the at least one valve element comprises a magnetic source providing a persistent magnetic field and the other comprises a non-magnetized, magnetically permeable mass such that, when at least one of the masses is brought into register with a second linear axis, reluctance-induced forces translate the corresponding valve element towards the mass along the first linear axis.

10. The valve of claim 9, wherein the mass comprises a permanent magnet.

11. The valve of claim 9, wherein the valve element comprises a permanent magnet.

12. The valve of claim 9, wherein the first linear axis is substantially parallel to the first plane.

13. The valve of claim 9, wherein the first linear axis is substantially orthogonal to the first plane.

14. The valve of claim 9, wherein the first linear axis is colinear with the second linear axis.

15. The valve of claim 9, wherein the first linear axis is substantially orthogonal to the second linear axis.

16. The valve of claim 9, wherein the translation in the first plane comprises motion along a substantially linear path.

17. The valve of claim 9, wherein the translation in the first plane comprises motion along a curvilinear path.

18. The valve of claim 9, wherein:
   the at least one valve element comprises a first plurality of valve elements,
   each of the first plurality of valve elements are located out of the first plane and are configured to translate along a corresponding linear axis.

19. The valve of claim 18, further comprising a carrier, wherein:
   the at least one mass comprises a first plurality of masses,
   the carrier is configured to translate the first plurality of masses in the first plane, and,
   each of the first plurality of masses is configured to register with at least one of the linear axes corresponding to the first plurality of valve elements.

20. A valve comprising:
   means for translating at least one mass in a first plane; and,
   at least one valve element located out of the first plane and configured to translate along a first linear axis,
   wherein at least one of the at least one mass and the at least one valve element comprises a magnetic source providing a persistent magnetic field and the other comprises a non-magnetized, magnetically permeable mass such that, when at least one of the masses is brought into register with a second linear axis, reluctance-induced forces translate the corresponding valve element towards the mass along the first linear axis.

* * * * *